United States Patent Office 3,499,968
Patented Mar. 10, 1970

3,499,968
COMPOSITION AND METHOD FOR COMBATTING POULTRY COCCIDIOSIS WITH 3,6-DICHLOROBENZAMIDE
Edward F. Rogers, Middletown, and Robert L. Clark, Woodbridge, N.J., assignors to Merck & Co., Inc., Rahway, N.J., a corporation of New Jersey
No Drawing. Continuation of application Ser. No. 319,656, Oct. 29, 1963. This application Nov. 1, 1968, Ser. No. 774,573
Int. Cl. A61u 27/00
U.S. Cl. 424—324                   2 Claims

ABSTRACT OF THE DISCLOSURE

Anticoccidial compositions are described wherein the essential anticoccidial ingredient is 2,6-dichloro-4-nitrobenzamide.

---

This is a continuation application of Ser. No. 319,656, filed Oct. 29, 1963, and now abandoned.

This invention relates generally to new chemical compounds. More specifically, it relates to a benzamide useful in the treatment of poultry disease. Still more specifically, it is directed to 2,6-dichloro-4-nitrobenzamide, its method of preparation, and its use as a coccidiostat. It is also concerned with new anticoccidial compositions containing 2,6-dichloro-4-nitrobenzamide as an active ingredient.

Coccidiosis is an intestinal infection caused by the invasion and destruction of caecal and intestinal mucosa by coccidia, protozoan parasites of the genus Eimeria. It is a particularly serious economic problem for the poultry industry. Many types of coccidiosis occur depending upon the species of Eimeria present and birds that have survived an outbreak caused by one species are still susceptible to attacks by other species. The disease is characterized by diarrhea and hemorrhage and when left untreated may lead to poor weight gain, reduced feed efficiency, reduced egg production and death.

The most troublesome species of coccidia are *E. tenella* and *E. necatrix* in that they are the most lethal forms of the disease. Both act primarily in the caecum and cause what are characterized as caecal forms of coccidiosis. *E. acervulina, E. maxima* and *E. brunetti* cause an intestinal form of coccidiosis which is also a great problem for the poultry raiser. Although several commercially available coccidiostats are highly effective against the caecal forms of coccidiosis they may be less active or inactive against other species such as the intestinal species. According to the present invention, it has now been found that 2,6-dichloro-4-nitro-benzamide possesses unexpected beneficial activity against the intestinal species, and particularly against *E. brunetti*, while also displaying good activity against the caecal forms of coccidia.

It is thus an object of the present invention to provide a chemical compound that is useful in the control of coccidiosis, namely 2,6-dichloro-4-nitrobenzamide. It is a further object to provide a method of preparing such compound from 2,6-dichloro-4-nitroaniline. An additional object is provision of novel compounds useful as intermediates in such syntheses. A further object is provision of novel compositions containing 2,6-dichloro-4-nitrobenzamide as an active anticoccidial ingredient. Further objects will be evident from the ensuing description of the invention.

The 2,6-dichloro-4-nitrobenzamide of this invention is prepared from 2,6-dichloro-4-nitroaniline by a process which comprises converting 2,6-dichloro-4-nitroaniline to a 2,6-dichloro-4-nitrobenzenediazonium salt of a strong mineral acid, treating this salt with cyanide ion to form 2,6-dichloro-4-nitrobenzonitrile, and subsequently converting the benzonitrile to 2,6-dichloro-4-nitrobenzamide by hydrolysis.

This reaction sequence may be represented as follows:

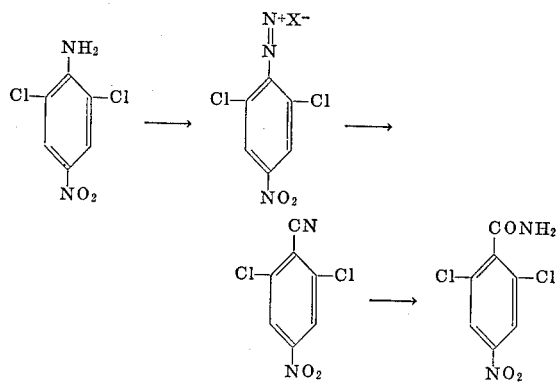

where X⁻ represents an anion of a strong mineral acid.

In the first step of the synthesis, 2,6-dichloro-4-nitroaniline is converted to the diazonium salt by reacting it with an alkali metal nitrite such as sodium or potassium nitrite under diazotization conditions. The diazotization is carried out by intimately contacting the reactants at low temperatures in the presence of a strong mineral acid, such as sulfuric or hydrochloric acid. Reaction temperature of between about −10° C. to +10° C. are suitable, and good results are obtained by carrying out the diazotization under these conditions for from 1–5 hours.

The 2,6-dichloro-4-nitrobenzenediazonium salt thus obtained is readily converted directly without isolation to 2,6-dichloro-4-nitrobenzonitrile by reaction with cyanide ion in an aqueous medium and in the presence of a suitable catalyst. It is convenient to employ an alkali metal cyanide, such as sodium or potassium cyanide as the source of cyanide ion. The preferred catalyst is nickel chloride although other water-soluble nickel salts could be used if desired. Best results are obtained when the conversion of the diazonium salt to nitrile is brought about at a pH of 6–8 and neutralization of the reaction mixture with an alkali metal hydroxide or carbonate is preferred. Formation of 2,6-dichloro-4-nitrobenzonitrile is conveniently carried out at temperatures of 20–40° C. The desired product is insoluble in the aqueous reaction medium and is conveniently recovered and purified by techniques known to those skilled in this art.

In the last step of this process, the 2,6-dichloro-4-nitrobenzamide of the invention is obtained by hydrolyzing 2,6-dichloro-4-nitrobenzonitrile with a strong mineral acid and preferably with sulfuric acid. The desired hydrolysis is satisfactorily performed at 70–100° C., preferably at 80–90° C. for about 1–3 hours.

According to the present invention, 2,6-dichloro-4-nitrobenzamide has been found to possess beneficial properties as a coccidiostat. While it is useful in treating or preventing both the caecal and intestinal forms of poultry coccidiosis, it is particularly useful in combatting intestinal coccidiosis due to *E. brunetti*.

When used for combatting coccidiosis, the 2,6-dichloro-4-nitrobenzamide of this invention is administered to poultry as a component of the feed or drinking water. Although the amount of 2,6-dichloro-4-nitrobenzamide necessary for adequate control of the disease will vary with the severity of the infection and the duration of treatment, we have found that feed levels of from about .005% to about 0.125% by weight of the feedstuff are effective in controlling coccidiosis, with concentrations of about 0.01% to 0.05% by weight of feed being preferred. When the compound is administered by way of the drinking water, somewhat lower levels will be satisfactory since the birds drink about twice as much as they eat. The use of the active agent in drinking water is made more practically useful by addition to the water of a suspending agent which promotes even distribution of the water-insoluble material.

The 2,6-dichloro-4-nitrobenzamide may be added to the feed directly or by the use of premixes which may contain about 5% to 50% by weight of the active ingredient. These premixes or feed supplements in which the anticoccidial ingredient is present in relatively large amounts are a preferred aspect of this invention. The carrier vehicle or diluent for the premixes should be relatively inert or non-reactive ingredient, safely administrable to the poultry. The diluents preferred have nutritive value to the poultry and are normal ingredients of the finished feed. Diluents normally employed are solid orally ingestible ingredients such as distillers' dried grains, corn meal, wheat middlings, fermentation residue, corn gluten feed, citrus meal, ground oyster shells, Attapulgas clay, wheat shorts, molasses solubles, corn cob meal, toasted dehulled soya flour, soybean mill feed, crushed limestone, soya grits and the like.

In accordance with one aspect of the invention the finished feeds may consist of 2,6-dichloro-4-nitrobenzamide dispersed in compositions which furnish nourishment to the poultry and which are normally used as feeds in the poultry industry. The finished feed may be a mash containing ground grain, animal and vegetable proteins, mineral and vitamin concentrates, or it may be a broiler feed containing a large proportion of ground yellow corn together with other nutritive substances such as fish meal, soybean oil meal, meat products, minerals and vitamins.

The following examples are given for the purpose of illustration and not by way of limitation.

EXAMPLE 1

2,6-dichloro-4-nitrobenzamide

In a 1 l. 3-necked flask equipped with a stirrer, thermometer and cooling bath is placed 275 ml. of concentrated sulfuric acid. After cooling to about 5° C., 39 gm. of powdered sodium nitrite is cooled to 0° C. and a suspension of 103 gm. of 2,6-dichloro-4-nitroaniline in 500 ml. of acetic acid is added slowly, keeping the temperature around 0° C. This mixture is allowed to stir at 5° C. to 10° C. for about three hours.

A solution of 85 gm. of nickel chloride hexahydrate in 500 ml. of water, 175 gm. of potassium cyanide in 750 ml. of water and 475 gm. of sodium carbonate in 1250 ml. of water is prepared. This solution is cooled to about 20° C. and the cold diazonium solution earlier prepared added slowly. At first effervescing takes place and at the end of the addition the temperature of this mixture is about 35° C. It is then stirred at room temperature overnight, filtered, the precipitate washed with water and partially dried. This solid is extracted three times by decantation with hot ether and the total ether solution is filtered. Evaporation of the ether yields 94 gm. of a solid that melts at 120–135° C. Warming and agitating this solid with about 200 ml. of ether removes some color leaving 77 gm. of 2,6-dichloro-4-nitrobenzonitrile which melts at 138–140° C. This is recrystallized from 850 ml. of hot ethanol by treatment with activated charcoal to give 48 gm. of the benzonitrile, M.P. 140–142° C. Concentration of the ethanol filtrate yields another 12 gm., M.P. 140–142° C.

To 60 ml. of concentrated $H_2SO_4$ is added 13 gm. of 2,6-dichloro-4-nitrobenzonitrile. This mixture is warmed on the steam bath to obtain a solution, and 1 ml. of fuming $H_2SO_4$ is then added. The solution is heated for 2 hours on the steam bath and poured onto ice. The crude yellow product, 2,6-dichloro-4-nitrobenzamide, weighs 12.2 gm., M.P. 188–192° C. Extraction with 75 ml. of hot ethanol leaves 10.4 gm. of 2,6-dichloro-4-nitrobenzamide which melts at 191–192° C.

The novel coccidiostat of this invention, 2,6-dichloro-4-nitrobenzamide, is effective against the coccidia *E. maxima* and *E. tenella* at a feed level concentration of 0.025% by weight and is effective against *E. acervulina* and *E. brunetti* at feed levels of 0.05% and 0.006%, respectively.

EXAMPLE 2

Groups of ten two-week old White Leghorn chicks are fed a mash diet containing various amounts of 2,6-dichloro-4-nitrobenzamide uniformly dispersed in the feed. After being on this ration for 24 hours, each chick is orally inoculated with 100,000 sporulated oocysts of *E. brunetti*. Other groups of ten chicks each are fed a similar mash diet containing no coccidiostat. Some of the groups are infected in the same manner after 24 hours and serve as positive or infected controls. Still other groups of ten chicks each are fed the mash free of coccidiostat and are not infected with coccodiosis. These serve as normal controls. The diets are administered to the chicks for eight days following the date of infection. At the end of this time the birds are sacrificed and weighed. The oocyst count is determined by microscopic examination of intestinal homogenates. The following results, expressed as mean values, are obtained.

| Medication | Conc. in diet (wt. precent) | No. chicks | Percent wt. gain | Millions of oocysts bird |
|---|---|---|---|---|
| 2,6-dichloro-4-nitrobenzamide. | 0.006 | 10 | 45 | 1.9 |
| | 0.0125 | 10 | 61 | 3.7 |
| | 0.025 | 10 | 101 | 0.5 |
| | 0.05 | 10 | 102 | 0.9 |
| | 0.1 | 10 | 92 | 0.2 |
| Infected control | | 30 | 38 | 5.3 |
| Normal control | | 20 | 107 | |

We claim:
1. A composition useful in the control of coccidiosis which comprises a poultry feed having intimately dispersed therein at least about 0.005% to about 0.125% by weight of 2,6-dichloro-4-nitrobenzamide.
2. A method of combatting poultry coccidiosis which comprises orally administering to poultry from about 0.005% to about 0.125% by weight of 2,6-dichloro-4-nitrobenzamide, the weight based on the amount of poultry feed.

References Cited

UNITED STATES PATENTS 3,161,564   12/1964   Morehouse _____ 424—324

OTHER REFERENCES

Hankanen, Publication of Finnish Science Academie, Series A, II, 99 (1960), pp. 26–27 and 62–63.

ALBERT T. MEYERS, Primary Examiner

S. J. FRIEDMAN, Assistant Examiner